United States Patent
Yokozawa et al.

(10) Patent No.: US 9,109,081 B2
(45) Date of Patent: Aug. 18, 2015

(54) METHOD FOR PRODUCING AROMATIC POLYMER

(75) Inventors: Tsutomu Yokozawa, Yokohama (JP); Kazuei Ohuchi, Tsukuba (JP); Yasuhiro Kubota, Tsukuba (JP); Hideyuki Higashimura, Tsukuba (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 1314 days.

(21) Appl. No.: 11/816,195

(22) PCT Filed: Feb. 15, 2006

(86) PCT No.: PCT/JP2006/003096
§ 371 (c)(1),
(2), (4) Date: Sep. 12, 2007

(87) PCT Pub. No.: WO2006/088217
PCT Pub. Date: Aug. 24, 2006

(65) Prior Publication Data
US 2010/0144999 A1    Jun. 10, 2010

(30) Foreign Application Priority Data

Feb. 16, 2005 (JP) ................... 2005-038853
Sep. 29, 2005 (JP) ................... 2005-283888

(51) Int. Cl.
| | | |
|---|---|---|
| C08G 79/00 | (2006.01) | |
| C08G 61/02 | (2006.01) | |
| C08G 61/10 | (2006.01) | |
| B01J 31/22 | (2006.01) | |
| B01J 31/24 | (2006.01) | |

(52) U.S. Cl.
CPC ............... *C08G 61/02* (2013.01); *C08G 61/10* (2013.01); *B01J 31/2295* (2013.01); *B01J 31/24* (2013.01); *B01J 2531/824* (2013.01); *C08G 2261/312* (2013.01); *C08G 2261/3142* (2013.01); *C08G 2261/411* (2013.01)

(58) Field of Classification Search
CPC ............................... C08G 61/00; C08G 61/12
USPC .......................... 528/4, 15, 42, 397
See application file for complete search history.

(56) References Cited

U.S. PATENT DOCUMENTS

| | | | | |
|---|---|---|---|---|
| 5,777,070 | A * | 7/1998 | Inbasekaran et al. | 528/394 |
| 5,889,134 | A * | 3/1999 | Pu et al. | 528/86 |
| 5,902,904 | A * | 5/1999 | Laneman et al. | 568/8 |
| 6,353,072 | B1 * | 3/2002 | Towns et al. | 528/4 |
| 6,403,705 | B1 | 6/2002 | Balavoine et al. | |
| 6,417,357 | B1 * | 7/2002 | Tinkl et al. | 544/216 |
| 6,630,556 | B2 * | 10/2003 | Tomida et al. | 526/264 |
| 6,956,095 | B2 * | 10/2005 | Treacher et al. | 528/8 |
| 7,074,884 | B2 * | 7/2006 | Towns et al. | 528/394 |
| 7,173,103 | B2 * | 2/2007 | Towns et al. | 528/394 |
| 7,524,923 | B1 * | 4/2009 | Lee et al. | 528/394 |
| 2002/0128501 | A1 * | 9/2002 | Zhang | 556/9 |
| 2002/0147198 | A1 * | 10/2002 | Chen et al. | 514/247 |
| 2004/0260090 | A1 * | 12/2004 | Treacher et al. | 544/224 |

(Continued)

FOREIGN PATENT DOCUMENTS

| | | |
|---|---|---|
| JP | 11-80346 A | 3/1999 |
| JP | 11080346 A * | 3/1999 |

(Continued)

OTHER PUBLICATIONS

Yokoyama et al., "Chain-Growth Polymerization for Poly(3-hexylthiophene) with a Defined Molecular Weight and a Low Polydispersity", Macromolecules, vol. 37, Jan. 29, 2004, pp. 1169-1171.

(Continued)

*Primary Examiner* — Liam J Heincer
(74) *Attorney, Agent, or Firm* — Sughrue Mion, PLLC

(57) ABSTRACT

A method for producing an aromatic polymer comprising polycondensing an aromatic compound of the following formula (I) in the presence of a palladium complex containing a phosphine compound of the following formula (II):

$$M-(Y)_n-Ar-X \quad (I)$$

(wherein, Ar represents an aromatic ring-containing bi-functional organic group. X represents a halogen atom, nitro group or group of the formula $-SO_3Q$ (wherein, Q represents an optionally substituted hydrocarbon group). Y represents an oxygen atom, sulfur atom or the like, and n represents 0 or 1. M represents a hydrogen atom, $-B(OQ^1)_2$ or the like ($Q^1$ represents a hydrogen atom or hydrocarbon group.)

$$P(R^1)_3 \quad (II)$$

(wherein, $R^1$ represents a group of the following formula (III) or a group of the following formula (IV) and three $R^1$s may be the same or different, providing at least one of three $R^1$s is a group of the following formula (III))

$$-C(R^2)_3 \quad (III)$$

(wherein, $R^2$ represents a hydrogen atom or an optionally substituted hydrocarbon group)

$$(IV)$$

[structure with benzene ring substituted by $R^3$, $R^4$, $R^5$, $R^6$, $R^7$]

(wherein, $R^3$ to $R^7$ represent each independently a hydrogen atom, optionally substituted hydrocarbon group or the like).

3 Claims, No Drawings

(56) References Cited

U.S. PATENT DOCUMENTS

| | | | |
|---|---|---|---|
| 2005/0014926 A1* | 1/2005 | Towns et al. | 528/394 |
| 2005/0263758 A1* | 12/2005 | Treacher et al. | 257/40 |
| 2006/0220004 A1* | 10/2006 | Stossel et al. | 257/40 |
| 2006/0281923 A1* | 12/2006 | Ionkin | 546/14 |
| 2008/0207851 A1* | 8/2008 | Schulte et al. | 526/64 |
| 2008/0217605 A1* | 9/2008 | Wallace et al. | 257/40 |
| 2008/0233429 A1* | 9/2008 | Oguma et al. | 428/690 |
| 2009/0045725 A1* | 2/2009 | Fukushima et al. | 313/504 |
| 2009/0207346 A1* | 8/2009 | Ohuchi et al. | 349/69 |
| 2009/0209715 A1* | 8/2009 | Ohuchi et al. | 526/258 |
| 2010/0069603 A1* | 3/2010 | Tanaka et al. | 528/374 |
| 2010/0099823 A1* | 4/2010 | Yokozawa et al. | 525/203 |

FOREIGN PATENT DOCUMENTS

| | | |
|---|---|---|
| JP | 2002-506481 A | 2/2002 |
| JP | 2003-238662 A | 8/2003 |
| JP | 2004-67793 A | 3/2004 |
| JP | 2004-091330 A | 3/2004 |
| JP | 2004-115695 A | 4/2004 |
| JP | 2005-75913 A | 3/2005 |
| JP | 2006-060116 A | 3/2006 |
| WO | 99/54385 A1 | 10/1999 |
| WO | WO 03-035796 A1 | 5/2003 |
| WO | 03/048225 A2 | 6/2003 |

OTHER PUBLICATIONS

Sheina et al., "Chain Growth Mechanism for Regioregular Nickel-Initiated Cross-Coupling Polymerizations", Macromolecules, vol. 37, Jan. 1, 2004, pp. 3526-3528.

Rehahn et al., "Variation of the length and the density of the solubilizing side chains", Makromol. Chem., vol. 191, 1990, pp. 1991-2003.

Martina et al., "Progress toward the development of a chemical synthesis for poly(2,5-pyrrole)", Synthetic Metals, vol. 51, 1992, pp. 299-305.

Marsitzky et al., "End-Functionalization of Poly(2,7-fluorene): A Key Step toward Novel Luminescent Rod-Coil Block Copolymers", Macromolecules, vol. 32, 1999, pp. 8685-8688.

Zhang et al., "Geometically-Controlled and Site-Specifically-Functionalized Phenylacetylene Macrocycles", J. Am Chem. Soc., vol. 116, 1994, pp. 4227-4239.

Machine Generated English Translation of JP-A 2005-075913 to JFE Chemical Corp (published Mar. 24, 2005).

Machine generated English translation of JP-A 11-080346 to Tosoh Corp. (published Mar. 26, 1999).

Machine generated English translation of JP-A 2004-067793 to National Institute of Advanced Industrial & Technology et al. (published Mar. 4, 2004).

Machine generated English translation of JP-A 2003-238662 to JSR Corp. (published Aug. 27, 2003).

J. Hassan et al., "Aryl-Aryl Bond Formation One Century after the Discovery of the Ullmann Reaction", Chemical Reviews, vol. 102, No. 5, 2002, pp. 1359-1469.

Cheng-Guo Dong and Qiao-Sheng Hu, "Preferential Oxidative Addition in Palladium(0)-Catalized Suzuki Cross-Coupling Reactions of Dihaloarenes with Arylboronic Acids", J. Am. Chem. Soc., vol. 127, No. 28, 2005, pp. 10006-10007.

Office Action issued May 10, 2011, in Japanese Patent Application No. 2006-039065 with English translation.

Office Action issued Dec. 23, 2011 in European Patent Application No. 06 714 236.4.

Felix E. Goodson, et al., "Palladium-Catalyzed Synthesis of Pure, Regiodefined Polymeric Triarylamines", J. Am. Chem. Soc., 1999, vol. 121, pp. 7527-7539.

Second Office Action issued Dec. 6, 2011 in Chinese Patent Application No. 200680012492.X with translation.

* cited by examiner

METHOD FOR PRODUCING AROMATIC POLYMER

TECHNICAL FIELD

The present invention relates to a method for producing an aromatic polymer.

BACKGROUND ART

It is known that aromatic polymers have excellent properties in electric properties, optical properties, heat resistance, mechanical properties and the like, and are useful for advanced functional materials such as electrically conductive materials, photoelectric conversion materials, light emitting materials, nonlinear optical materials, battery materials, electronic part materials, automobile materials and the like.

As a method for producing the polymer, there is known a production method utilizing polycondensation of an aromatic compound (Chem. Rev. 102, 1359 (2002)).

In the above-mentioned method, however, it is difficult to obtain an aromatic polymer having high molecular weight and narrow molecular weight distribution.

DISCLOSURE OF THE INVENTION

The present invention has an object of providing a method for producing an aromatic polymer having high molecular weight and narrow molecular weight distribution.

That is, the present invention provides a method for producing an aromatic polymer characterized by comprising polycondensing an aromatic compound of the following formula (I) in the presence of a palladium complex containing a phosphine compound of the following formula (II):

(I)

(wherein, Ar represents an aromatic ring-containing bi-functional organic group. X represents a halogen atom, a nitro group or a group of the formula —SO$_3$Q (wherein, Q represents an optionally substituted hydrocarbon group). Y represents an oxygen atom, sulfur atom, imino group, substituted imino group, ethenylene group, substituted ethenylene group or ethynylene group, and n represents 0 or 1. M represents a hydrogen atom, —B(OQ$^1$)$_2$, —Si(Q$^2$)$_3$, —Sn(Q$^3$)$_3$ or Z$^1$(Z$^2$)$_m$ (wherein, Q$^1$ represents a hydrogen atom or hydrocarbon group and two Q$^1$s may be the same or different and may form a ring, Q$^2$ represents a hydrocarbon group and three Q$^2$s may be the same or different, and Q$^3$ represents a hydrocarbon group and three Q$^3$s may be the same or different. Z$^1$ represents a metal atom or metal ion, Z$^2$ represents a counter anion, and m represents an integer of 0 or more.)

(II)

(wherein, R$^1$ represents a group of the following formula (III) or a group of the following formula (IV) and three R$^1$s may be the same or different, providing at least one of three R$^1$s is a group of the following formula (III))

(III)

(wherein, R$^2$ represents a hydrogen atom or an optionally substituted hydrocarbon group, three R$^2$s may be the same or different, two R$^2$s may together form a ring, providing two or more R$^2$s do not represent a hydrogen atom simultaneously)

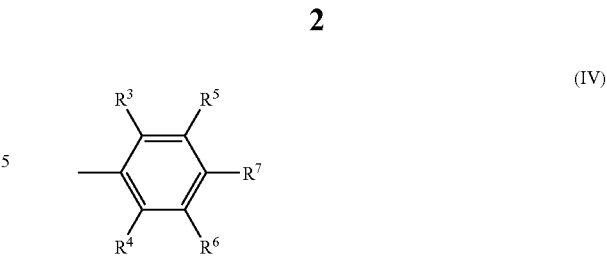

(wherein, R$^3$ to R$^7$ represent each independently a hydrogen atom, optionally substituted hydrocarbon group, optionally substituted hydrocarbon oxy group, optionally substituted hydrocarbon di-substituted amino group, optionally substituted hydrocarbon mercapto group, optionally substituted hydrocarbon carbonyl group, optionally substituted hydrocarbon oxycarbonyl group, optionally substituted hydrocarbon di-substituted aminocarbonyl group or optionally substituted hydrocarbon sulfonyl group, at least one of R$^3$ and R$^4$ is not a hydrogen atom, and R$^3$ and R$^5$, R$^5$ and R$^7$, R$^4$ and R$^6$, and R$^6$ and R$^7$ may each together form a ring).

BEST MODES FOR CARRYING OUT THE INVENTION

The present invention is a method for producing an aromatic polymer in which an aromatic compound of the above-described general formula (I) is polycondensed in the presence of a palladium complex containing a phosphine compound of the above-described general formula (II).

Ar in the above-described general formula (I) represents an aromatic ring-containing bi-functional organic group. As basic skeletons of the organic group, mentioned are mono-cyclic aromatic rings such as a benzene ring, pyridine ring, 1,2-diazine ring, 1,3-diazine ring, 1,4-diazine ring, 1,3,5-triazine ring, furan ring, pyrrole ring, thiophene ring, pyrazole ring, imidazole ring, oxazole ring, thiazole ring, oxadiazole ring, thiadiazole ring and azadiazole ring; ring-condensing aromatic rings obtained by condensing two or more rings selected each independently from the above-mentioned mono-cyclic aromatic rings; poly-cyclic aromatic rings obtained by connecting two or more rings selected each independently from the above-mentioned mono-cyclic aromatic rings and/or ring-condensing aromatic rings via a single bond, methylene group, ethylene group, ethenylene group, ethynylene group, oxygen atom, sulfur atom, imino group, carbonyl group or sulfonyl group; and transannular aromatic rings having at least one structure of linking adjacent two aromatic rings in the above-described ring-condensing aromatic rings or poly-cyclic aromatic rings with a methylene group, ethylene group, carbonyl group or sulfonyl group. In the above-described ring-condensing aromatic ring, the number of mono-cyclic aromatic rings to be condensed is preferably 2 to 4, more preferably 2 to 3, further preferably 2. In the above-described poly-cyclic aromatic ring, the number of mono-cyclic aromatic rings and/or ring-condensing aromatic rings to be connected is preferably 2 to 4, more preferably 2 to 3, further preferably 2. In the above-described transannular aromatic ring, the number of mono-cyclic aromatic rings and/or ring-condensing aromatic rings to be connected is preferably 1 to 4, more preferably 1 to 2, further preferably 1.

Among the above-described basic skeletons of the aromatic ring-containing organic group Ar, exemplified as the mono-cyclic aromatic ring are

1
2
3
4
5
6
7
8
9
10
11
12
13
14
15
16
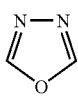
17
exemplified as the ring-condensing aromatic ring are
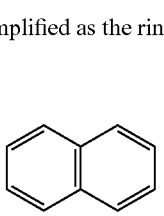
18
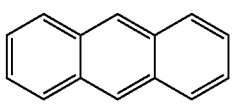
19
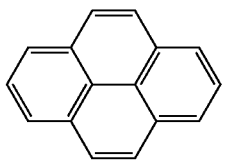
20
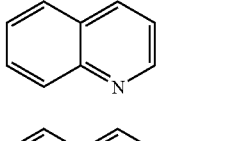
21
22
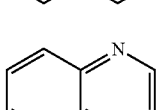
23
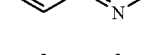
24
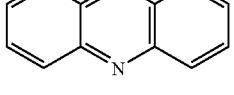
25
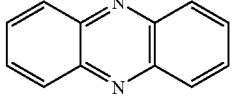
26
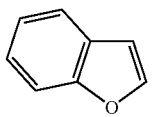
27
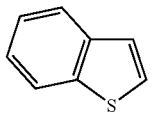
28

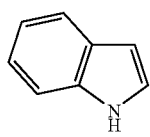
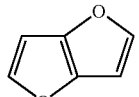
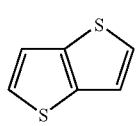
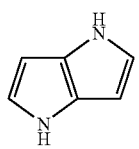
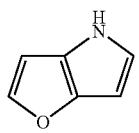
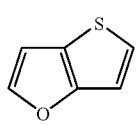
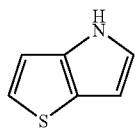
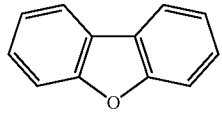
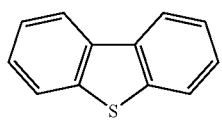
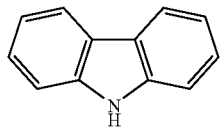
exemplified as the poly-cyclic aromatic ring are
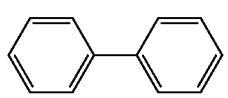
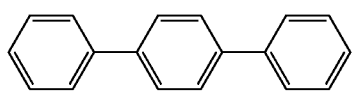
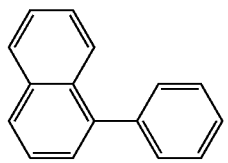
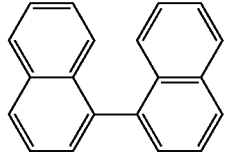
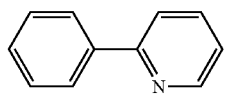
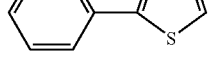
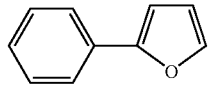
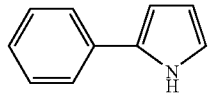
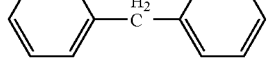
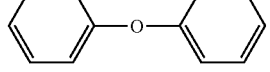
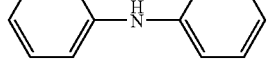
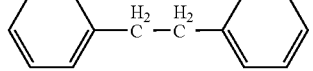
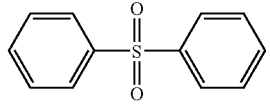

and, exemplified as the transannular aromatic ring are

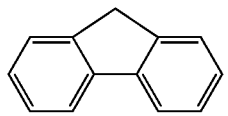
55

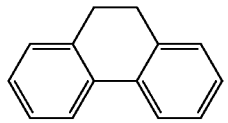
56

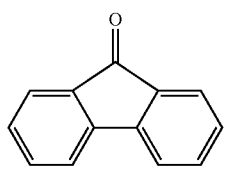
57

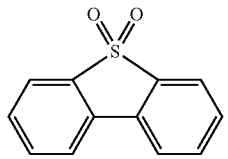
58

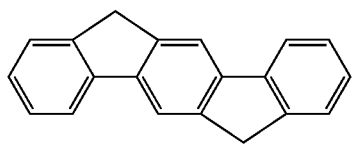
59

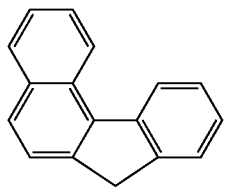
60

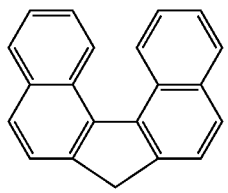
61

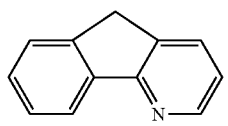
62

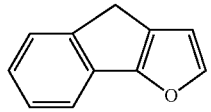
63

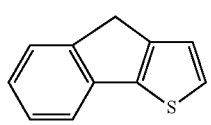
64

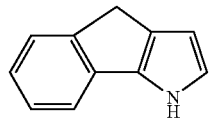
65

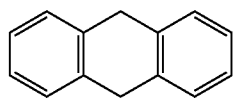
66

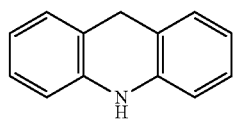
67

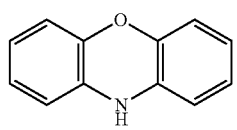
68

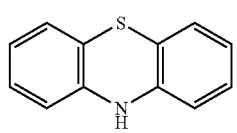
69

Among the above-described basic skeletons of the aromatic ring-containing organic group Ar, preferable are 1, 2, 7, 8, 9, 11, 12, 13, 14, 18, 19, 22, 23, 26, 27, 28, 29, 36, 37, 38, 39, 40, 41, 42, 43, 47, 48, 49, 50, 51, 52, 53, 54, 55, 56, 57, 59, 60, 68 and 69, more preferable are 1, 2, 7, 9, 18, 22, 36, 38, 43, 48, 49, 51, 52, 53, 55, 57 and 60, further preferable are 1, 7, 18, 36, 39, 48, 53, 55, 57 and 60, particularly preferable are 1, 18, 39, 55 and 60.

Regarding constituent atoms of the above-described basic skeletons of the aromatic ring-containing organic group Ar, preferable are basic skeletons composed only of a hydrogen atom, carbon atom, oxygen atom and nitrogen atom, more preferable are basic skeletons composed only of a hydrogen atom, carbon atom and oxygen atom, further preferable are basic skeletons composed only of a hydrogen atom and carbon atom.

In the above-described basic skeletons of the aromatic ring-containing organic group Ar, removal of each one hydrogen atom from two carbon atoms in an aromatic ring carrying hydrogen atoms gives an aromatic ring-containing bi-functional organic group.

In the above-mentioned aromatic ring-containing bi-functional organic group Ar, a hydrocarbon group, hydrocarbon oxy group, hydrocarbon di-substituted amino group, hydrocarbon mercapto group, hydrocarbon carbonyl group, hydrocarbon oxycarbonyl group, hydrocarbon di-substituted aminocarbonyl group or hydrocarbon sulfonyl group may be substituted on the carbon atom carrying hydrogen atoms, and a hydrocarbon group may be substituted on the nitrogen atom carrying hydrogen atoms, and when there are two or more substituents on the carbon atom and two or more substituents on the nitrogen atom, two substituents selected from them may be connected to form a ring.

Examples of the above-mentioned hydrocarbon group include alkyl groups having about 1 to 50 carbon atoms such as a methyl group, ethyl group, propyl group, isopropyl group, butyl group, isobutyl group, t-butyl group, pentyl group, hexyl group, nonyl group, dodecyl group, pentadecyl group, octadecyl group, docosyl group and the like; cyclic saturated hydrocarbon groups having about 3 to 50 carbon atoms such as a cyclopropyl group, cyclobutyl group, cyclobutyl group, cyclopentyl group, cyclohexyl group, cyclononyl group, cyclodocecyl group, norbonyl group, adamantyl group and the like; alkenyl group having about 2 to 50 carbon atoms such as an ethenyl group, propenyl group, 3-butenyl group, 2-butenyl group, 2-pentenyl group, 2-hexenyl group, 2-nonenyl group, 2-dodecenyl group and the like; aryl group having about 6 to 50 carbon atoms such as a phenyl group, 1-naphthyl group, 2-naphthyl group, 2-methylphenyl group, 3-methylphenyl group, 4-methylphenyl group, 4-ethylphenyl group, 4-propylphenyl group, 4-isopropylphenyl group, 4-butylphenyl group, 4-t-butylphenyl group, 4-hexylphenyl group, 4-cyclohexylphenyl group, 4-adamantylphenyl group, 4-phenylphenyl group and the like; and aralkyl group having about 7 to 50 carbon atoms such as a phenylmethyl group, 1-phenyleneethyl group, 2-phenylethyl group, 1-phenyl-1-propyl group, 1-phenyl-2-propyl group, 2-phenyl-2-propyl group, 3-phenyl-1-propyl group, 4-phenyl-1-butyl group, 5-phenyl-1-pentyl group, 6-phenyl-1-hexyl group and the like.

Among them, hydrocarbon groups having 1 to 20 carbon atoms are preferable, hydrocarbon groups having 1 to 12 carbon atoms are more preferable, hydrocarbon groups having 1 to 8 carbon atoms are further preferable.

The above-mentioned hydrocarbon oxy group, hydrocarbon mercapto group, hydrocarbon carbonyl group, hydrocarbon oxycarbonyl group and hydrocarbon sulfonyl group are those obtained by bonding one of the above-described hydrocarbon groups to an oxy group, mercapto group, carbonyl group, oxycarbonyl group and sulfonyl group. The above-mentioned hydrocarbon di-substituted amino group and hydrocarbon di-substituted aminocarbonyl group are those obtained by bonding two of the above-described hydrocarbon groups to an amino group and aminocarbonyl group.

As the substituent on the above-described aromatic ring-containing bi-functional organic group Ar, a hydrocarbon group, hydrocarbon oxy group, hydrocarbon di-substituted amino group, hydrocarbon mercapto group, hydrocarbon carbonyl group and hydrocarbon oxycarbonyl group are preferable, a hydrocarbon group, hydrocarbon oxy group and hydrocarbon di-substituted amino group are more preferable, and a hydrocarbon group and hydrocarbon oxy group are further preferable, for the carbon atom carrying hydrogen atoms. For the nitrogen atom carrying hydrogen atoms, substitution with a hydrocarbon group is preferable.

X in the above-described general formula (I) represents a halogen atom, a nitro group or a group of the formula —$SO_3Q$ (wherein, Q represents an optionally substituted hydrocarbon group), and preferably represents a halogen atom or group of the formula: —$SO_3Q$ (wherein, Q represents an optionally substituted hydrocarbon group).

The halogen atom herein referred to include a fluorine atom, chlorine atom, bromine atom and iodine atom, and preferably a chlorine atom, bromine atom and iodine atom.

As the optionally substituted hydrocarbon group in Q of the group represented by formula —$SO_3Q$, the above-described hydrocarbon groups are mentioned, and as the substituent, for example, a fluorine atom is mentioned.

Specific examples of the group of the formula —$SO_3Q$ include a methane sulfonate group, benzene sulfonate group, p-toluene sulfonate group and trifluoromethane sulfonate group.

As X, preferable are halogen atoms and groups of the formula —$SO_3Q$, more preferable are a chlorine atom, bromine atom, iodine atom and groups of the formula —$SO_3Q$, further preferable are a chlorine atom, bromine atom, iodine atom and trifluoromethane sulfonate group.

Y in the above-described general formula (I) represents an oxygen atom, sulfur atom, imino group, substituted imino group, ethenylene group, substituted ethenylene group or ethynylene group, and n represents 0 or 1.

Here, the substituted imino group is a group of the formula —N(Q')-(Q' represents a substituent), and hydrocarbon groups are mentioned as Q'. Specific examples of the hydrocarbon group include those described above.

The substituted ethenylene group is a group of the formula: —C(Q'')=C(Q''')-(Q'' and Q''' represent each independently a hydrogen atom or substituent, and at least one of Q'' and Q''' is a substituent). Here, mentioned as the substituted represented by Q'' and Q''' are hydrocarbon groups. Specific examples of the hydrocarbon group include those described above.

Y represents preferably an oxygen atom, imino group, substituted imino group or ethynylene group, more preferably an oxygen atom, imino group or substituted imino group, further preferably an oxygen atom or imino group. n represents preferably 0.

M in the above-described general formula (I) represents a hydrogen atom, —$B(OQ^1)_2$, —$Si(Q^2)_3$, —$Sn(Q^3)_3$ or $Z^1(Z^2)_m$.

$Q^1$ in —$B(OQ^1)_2$ represents a hydrogen atom or hydrocarbon group and two $Q^1$s may be the same or different and may form a ring. The hydrocarbon group $Q^1$ includes the above-described hydrocarbon groups, and preferable are alkyl groups, more preferable are a methyl group, ethyl group, propyl group, isopropyl group, butyl group, isobutyl group, pentyl group, hexyl group and nonyl group, further preferable are a methyl group, ethyl group, propyl group, butyl group, pentyl group and hexyl group. In the case of formation of a ring, preferable as the bi-functional hydrocarbon group composed of two $Q^3$ are a 1,2-ethylene group, 1,1,2,2-tetramethyl-1,2-ethylene group, 1,3-propylene group, 2,2-dimethyl-1,3-propylene group and 1,2-phenylene group.

$Q^2$ in —$Si(Q^2)_3$ represents a hydrocarbon group and three $Q^2$s may be the same or different. The hydrocarbon group $Q^2$ includes the above-described hydrocarbon groups, and preferable are alkyl groups, more preferable are a methyl group, ethyl group, propyl group, isopropyl group, butyl group, isobutyl group, pentyl group, hexyl group and nonyl group, further preferable are a methyl group, ethyl group, propyl group, butyl group, pentyl group and hexyl group.

$Q^3$ in —$Sn(Q^3)_3$ represents a hydrocarbon group and three $Q^3$s may be the same or different. The hydrocarbon group $Q^3$ includes the above-described hydrocarbon groups, and preferable are alkyl groups, more preferable are a methyl group, ethyl group, propyl group, isopropyl group, butyl group, isobutyl group, pentyl group, hexyl group and nonyl group, further preferable are a methyl group, ethyl group, propyl group, butyl group, pentyl group and hexyl group.

$Z^1$ in $Z^1(Z^2)_m$ represents a metal atom or metal ion, $Z^2$ represents a counter anion, and m represents an integer of 0 or more. Specific examples of $Z^1$ include atoms such as Li, Na, K, Rb, Cs, Be, Mg, Ca, Sr, Ba, Al, Ga, In, Ti, Pb, Sc, Ti, V, Cr, Mn, Fe, Co, Ni, Cu, Zn, Y, Zr, Nb, Mo, Tc, Ru, Rh, Ag, Cd, La, Ce, Sm, Eu, Hf, Ta, W, Re, Os, Ir, Pt, Au, Hg and the like or ions thereof. Preferable are Li, Na, K, Rb, Cs, Be, Mg, Ca, Sr, Ba, Al, Ga, In, Ti, Pb, Sc, Ti, Cu, Zn, Y, Zr, Ag and Hg, more preferable are Li, Na, K, Rb, Cs, Be, Mg, Ca, In, Ti, Pb, Cu, Zn, Zr, Ag and Hg, further preferable are Li, Na, K, Mg, Ca, Cu and Zn.

As $Z^2$, conjugated bases of Brönsted acids are usually used, and specific examples thereof include a fluoride ion, chloride ion, bromide ion, iodide ion, sulfate ion, nitrate ion, carbonate ion, perchlorate ion, tetrafluoroborate ion, hexafluorophosphate ion, methanesulfonate ion, trifluoromethanesulfonate ion, toluenesulfonate ion, acetate ion, trifluoroacetate ion, propionate ion, benzoate ion, hydroxide ion, oxide ion, methoxide ion, ethoxide ion and the like. Preferable are a chloride ion, bromide ion, iodide ion, sulfate ion, nitrate ion, carbonate ion, methanesulfonate ion, trifluoromethanesulfonate ion, toluenesulfonate ion, acetate ion, trifluoroacetate ion, propionate ion and benzoate ion, more preferable are a chloride ion, bromine ion, methanesulfonate ion, trifluoromethanesulfonate ion, toluenesulfonate ion, acetate ion, trifluoroacetate ion, propionate ion and benzoate ion, further preferable are a chloride ion, bromide ion, methanesulfonate ion, trifluoromethanesulfonate ion, acetate ion and trifluoroacetate ion.

m is so determined that the aromatic compound of the above-described general formula (I) becomes electrically neutral. When M represents $Z^1(Z^2)_m$, namely, when the aromatic compound of the above-described general formula (I) is represented by $Z^1(Z^2)_m$—$(Y)_n$—Ar—X, it is preferable that a $Z^1(Z^2)_m$ portion and a $(Y)_n$—Ar—X portion are ionically bonded hypothesizing that the $Z^1(Z^2)_m$ portion has positive 1 valency and the $(Y)_n$—Ar—X portion has negative 1 valency.

M in the above-described general formula (I) includes preferably an atom grouping including a boron atom, silicon atom, tin atom and metal atoms, more preferably an atom grouping including a boron atom, tin atom, magnesium atom and zinc atom, particularly preferably an atom grouping including a boron atom.

In the present invention, a palladium complex containing a phosphine compound of the above-described general formula (II) is used.

In the above-described general formula (II), represents a group of the above-described formula (III) or a group of the above-described formula (IV) and three $R^1$s may be the same or different, providing at least one of three $R^1$s is a group of the above-described general formula (III).

In the above-described general formula (III), $R^2$ represents a hydrogen atom or an optionally substituted hydrocarbon group, three $R^2$s may be the same or different, two $R^2$s may together form a ring, providing two or more $R^2$s do not represent a hydrogen atom simultaneously (that is, when $R^2$s do not together form a ring, at least two $R^2$s are optionally substituted hydrocarbon groups).

In the above-described general formula (IV), $R^3$ to $R^7$ represent each independently a hydrogen atom, optionally substituted hydrocarbon group, optionally substituted hydrocarbon oxy group, optionally substituted hydrocarbon di-substituted amino group, optionally substituted hydrocarbon mercapto group, optionally substituted hydrocarbon carbonyl group, optionally substituted hydrocarbon oxycarbonyl group, optionally substituted hydrocarbon di-substituted aminocarbonyl group or optionally substituted hydrocarbon sulfonyl group, preferably a hydrogen atom or optionally substituted hydrocarbon group, at least one of $R^3$ and $R^4$ is not a hydrogen atom, and $R^3$ and $R^5$, $R^5$ and $R^7$, $R^4$ and $R^6$, and $R^6$ and $R^7$ may each together form a ring.

Specific examples and preferable examples of the hydrocarbon group in the optionally substituted hydrocarbon group of $R^2$ in the above-described general formula (III) are the same as those of the hydrocarbon group as the substituent on the aromatic ring containing bi-functional organic group of Ar in the above-described general formula (I).

As the group of the above-described general formula (III), preferable are a t-butyl group, 3-ethyl-3-pentyl group, isopropyl group, isobutyl group, 3-pentyl group, cyclopentyl group, 1-methylcylohexyl group and cyclohexyl group, more preferable are a t-butyl group, cyclopentyl group and cyclohexyl group, further preferable are a t-butyl group and cyclohexyl group.

Specific examples of the hydrocarbon groups in the optionally substituted hydrocarbon group of $R^3$ to $R^7$ in the above-described general formula (IV) are the same as those of the aromatic ring-containing hydrocarbon group as the substituent on the bi-functional organic group of Ar in the above-described general formula (I). As the hydrocarbon group, preferable are alkyl groups having 1 to 12 carbon atoms, cycloalkyl groups having 3 to 12 carbon atoms and aryl groups having 6 to 12 carbon atoms, more preferable are aryl groups having 6 to 12 carbon atoms, particularly preferable is a phenyl group. Specific examples of the substituent are the same as those exemplified as the group optionally substituted on the carbon atom carrying hydrogen atoms, for the hydrocarbon group of the above-described aromatic ring-containing bi-functional organic group of Ar. As the hydrocarbon group, preferable are hydrocarbon groups having 1 to 12 carbon atoms, hydrocarbon oxy groups having 1 to 12 carbon atoms, hydrocarbon di-substituted amino groups having 2 to 12 carbon atoms and hydrocarbon mercapto groups having 1 to 12 carbon atoms, more preferable are hydrocarbon groups having 1 to 8 carbon atoms, hydrocarbon oxy groups having 1 to 8 carbon atoms and hydrocarbon di-substituted amino groups having 2 to 8 carbon atoms, further preferable are hydrocarbon groups having 1 to 6 carbon atoms and hydrocarbon oxy groups having 1 to 6 carbon atoms.

The definitions and also preferable examples and specific examples of the hydrocarbon oxy group in the optionally substituted hydrocarbon oxy group, the hydrocarbon di-substituted amino group in the optionally substituted hydrocarbon di-substituted amino group, the hydrocarbon mercapto group in the optionally substituted hydrocarbon mercapto group, the hydrocarbon carbonyl group in the optionally substituted hydrocarbon carbonyl group, the hydrocarbon oxycarbonyl group in the optionally substituted hydrocarbon oxycarbonyl group, the hydrocarbon di-substituted aminocarbonyl group in the optionally substituted hydrocarbon di-substituted aminocarbonyl group, and the hydrocarbon sulfonyl group in the optionally substituted hydrocarbon sulfonyl group, each represented by $R^3$ to $R^7$, are the same as for the substituent on the aromatic ring-containing bi-functional organic group Ar in the above-described general formula (I). The definitions and also preferable examples and specific examples of the substituent optionally substituted on them are the same as those for the substituent optionally substituted on the optionally substituted hydrocarbon group described above.

As $R^3$ to $R^7$ in the above-described general formula (IV), preferable are a hydrogen atom, optionally substituted hydrocarbon group, optionally substituted hydrocarbon oxy group and optionally substituted hydrocarbon di-substituted amino group, more preferable are a hydrogen atom, optionally substituted hydrocarbon group and optionally substituted hydrocarbon oxy group, further preferable are a hydrogen atom and optionally substituted hydrocarbon group.

The group of the above-described general formula (IV) includes a 2-methylphenyl group, 2,6-dimethylphenyl group, 2,4,6-trimethylphenyl group, 2-ethylphenyl group, 2,6-diethylphenyl group, 2-isopropylphenyl group, 2,6-diisopropylphenyl group, 2-t-butylphenyl group, 2-phenylphenyl group, 2,6-diphenylphenyl group, 2-methoxyphenyl group, 2,6-dimethoxyphenyl group, 2,4,6-trimethoxyphenyl group, 2-ethoxyphenyl group, 2,6-diethoxyphenyl group, 2-isopropoxyphenyl group, 2,6-diisopropoxyphenyl group, 2-t-butoxyphenyl group, 2-phenoxyphenyl group, 2,6-diphenoxyphenyl group, 2-(2-methylphenyl)phenyl group, 2-(2,6-dimethylphenyl)phenyl group, 2-(2-ethylphenyl)phenyl group, 2-(2,6-diethylphenyl)phenyl group, 2-(2-isopropylphenyl)phenyl group, 2-(2,6-di-isopropylphenyl)phenyl group, 2-(2-t-butylphenyl)phenyl group, 2-(2-methoxyphenyl)phenyl group, 2-(2,6-dimethoxyphenyl)phenyl group, 2-(2,4,6-trimethoxyphenyl)phenyl group, 2-(2-ethoxyphenyl)phenyl group, 2-(2,6-diethoxyphenyl)phenyl group, 2-(2-isopropoxyphenyl)phenyl group, 2-(2,6-di-isopropoxyphenyl)phenyl group, 2-(2-t-butoxyphenyl)phenyl group, 2-(2,6-t-butoxyphenyl)phenyl group and the like. Preferable are a 2-methylphenyl group, 2-ethylphenyl group, 2-isopropylphenyl group, 2-t-butylphenyl group, 2-phenylphenyl group, 2-methoxyphenyl group, 2-ethoxyphenyl group, 2-isopropoxyphenyl group, 2-t-butoxyphenyl group, 2-phenoxyphenyl group, 2-(2-methylphenyl)phenyl group, 2-(2,6-dimethylphenyl)phenyl group, 2-(2-ethylphenyl)phenyl group, 2-(2,6-diethylphenyl)phenyl group, 2-(2-isopropylphenyl)phenyl group, 2-(2,6-di-isopropylphenyl)phenyl group, 2-(2-t-butylphenyl)phenyl group, 2-(2-methoxyphenyl)phenyl group, 2-(2,6-dimethoxyphenyl)phenyl group, 2-(2,4,6-trimethoxyphenyl)phenyl group, 2-(2-ethoxyphenyl)phenyl group, 2-(2,6-diethoxyphenyl)phenyl group, 2-(2-isopropoxyphenyl)phenyl group, 2-(2,6-di-isopropoxyphenyl)phenyl group, 2-(2-t-butoxyphenyl)phenyl group and 2-(2,6-t-butoxyphenyl)phenyl group, more preferable are a 2-(2-methylphenyl)phenyl group, 2-(2,6-dimethylphenyl)phenyl group, 2-(2-ethylphenyl)phenyl group, 2-(2,6-diethylphenyl)phenyl group, 2-(2-isopropylphenyl)phenyl group, 2-(2,6-di-isopropylphenyl)phenyl group, 2-(2-t-butylphenyl)phenyl group, 2-(2-methoxyphenyl)phenyl group, 2-(2,6-dimethoxyphenyl)phenyl group, 2-(2,4,6-trimethoxyphenyl)phenyl group, 2-(2-ethoxyphenyl)phenyl group, 2-(2,6-diethoxyphenyl)phenyl group, 2-(2-isopropoxyphenyl)phenyl group, 2-(2,6-diisopropoxyphenyl)phenyl group, 2-(2-t-butoxyphenyl)phenyl group and 2-(2,6-t-butoxyphenyl)phenyl group, further preferable are a 2-(2,6-dimethylphenyl)phenyl group, 2-(2,6-diethylphenyl)phenyl group, 2-(2,6-di-isopropylphenyl)phenyl group, 2-(2-t-butylphenyl) phenyl group, 2-(2,6-dimethoxyphenyl)phenyl group, 2-(2-ethoxyphenyl)phenyl group, 2-(2,6-diethoxyphenyl)phenyl group, 2-(2,6-diisopropoxyphenyl)phenyl group and 2-(2,6-t-butoxyphenyl)phenyl group.

The above-described palladium complex containing a phosphine compound of the above-described general formula (II) can be produced, for example, by mixing this phosphine compound with a solubilized Pd (0) complex such as a palladium (0)•dibenzylidene acetone complex, alternatively, by reducing an acetate or chloride of palladium (II) in the presence of the phosphine compound to generate palladium (0). As the method for producing the palladium complex, exemplified are methods described in Chem. Rev. 102, 1359 (2002) and its reference literatures.

This palladium complex containing a phosphine compound may be used in polycondensation without isolation, or may be isolated before polycondensation.

Though the use amount of the phosphine compound is not restricted, the use amount (mol ratio) of the phosphine compound to palladium (0) is preferably 0.5 to 10, more preferably 0.8 to 5, further preferably 0.9 to 3.

Though the use amount of the complex is not restricted, the use amount Pd to an aromatic compound of the above-described general formula (I) is preferably 0.0001 to 10 mol %, more preferably 0.001 to 5 mol %, further preferably 0.01 to 5 mol %.

In the present invention, it is preferable that an aromatic compound of the following formula (V) is allowed to coexist in polycondensing an aromatic compound of the above-described general formula (I) in the presence of a palladium complex containing a phosphine compound of the above-described general formula (II), from the standpoint of narrowing the molecular weight distribution of the resultant aromatic polymer.

(wherein, $Ar^a$ represents an aromatic ring-containing mono-functional organic group. $X^a$ represents a halogen atom or a group of the formula: $—SO_3Q^a$ (wherein, $Q^a$ represents an optionally substituted hydrocarbon group)).

$Ar^a$ in the above-described general formula (V) is an aromatic ring-containing mono-functional organic group. Specific examples and preferable examples of the basic skeleton of this organic group are the same as those of the basic skeleton of the aromatic ring-containing organic group Ar of the above-described general formula (I).

In the above-described basic skeletons of the aromatic ring-containing organic group $Ar^a$, removal of one hydrogen atom from one carbon atom in an aromatic ring carrying hydrogen atoms gives an aromatic ring-containing mono-functional organic group.

In the above-described aromatic ring-containing mono-functional organic group $Ar^a$, a fluorine atom, nitro group, cyano group, hydrocarbon group, hydrocarbon oxy group, hydrocarbon di-substituted amino group, hydrocarbon mercapto group, hydrocarbon carbonyl group, hydrocarbon oxycarbonyl group, hydrocarbon di-substituted aminocarbonyl group or hydrocarbon sulfonyl group may be substituted on the carbon atom carrying hydrogen atoms, and a hydrocarbon group may be substituted on the nitrogen atom carrying hydrogen atoms, and two substituents selected from them may be connected to form a ring.

Specific examples and preferable examples of the above-described hydrocarbon group are the same as those of the hydrocarbon group as the substituent on the aromatic ring-containing bi-functional organic group Ar of the above-described general formula (I).

The above-mentioned hydrocarbon oxy group, hydrocarbon mercapto group, hydrocarbon carbonyl group, hydrocarbon oxycarbonyl group and hydrocarbon sulfonyl group are groups obtained by bonding one of the above-described hydrocarbon groups to an oxy group, mercapto group, carbonyl group, oxycarbonyl group and sulfonyl group. The hydrocarbon di-substituted amino group and hydrocarbon di-substituted aminocarbonyl group are those obtained by bonding two of the above-described hydrocarbon groups to an amino group and aminocarbonyl group.

As the substituent on the above-described aromatic ring-containing mono-functional organic group $Ar^a$, a fluorine atom, nitro group, cyano group, hydrocarbon group, hydrocarbon oxy group, hydrocarbon di-substituted amino group, hydrocarbon mercapto group, hydrocarbon carbonyl group and hydrocarbon oxycarbonyl group are preferable, a fluorine atom, nitro group, cyano group, hydrocarbon group, hydrocarbon oxy group and hydrocarbon di-substituted amino group are more preferable, and a fluorine atom, nitro group, cyano group, hydrocarbon group and hydrocarbon oxy group are further preferable, for the carbon atom carrying hydrogen atoms. For the nitrogen atom carrying hydrogen atoms, substitution with a hydrocarbon group is preferable.

$X^a$ in the above-described general formula (V) represents a halogen atom or group of the formula: $—SO_3Q^a$ (wherein, $Q^a$ represents an optionally substituted hydrocarbon group). The halogen atom herein referred to include a fluorine atom, chlorine atom, bromine atom and iodine atom, and preferably a chlorine atom, bromine atom and iodine atom.

As the optionally substituted hydrocarbon group in $Q^a$ of the group represented by formula $—SO_3Q^a$, the above-described hydrocarbon groups are mentioned, and as the substituent, for example, a fluorine atom is mentioned.

Specific examples of the group of the formula —SO$_3$Q$^a$ include a methane sulfonate group, benzene sulfonate group, p-toluene sulfonate group and trifluoromethane sulfonate group.

As X$^a$, preferable are halogen atoms and groups of the formula —SO$_3$Q$^a$, more preferable are a chlorine atom, bromine atom, iodine atom and groups of the formula —SO$_3$Q$^a$, further preferable are a bromine atom, iodine atom and trifluoromethane sulfonate group.

Though the use amount of an aromatic compound of the above-described general formula (V) is not restricted, the lower limit of the use amount for an aromatic compound of the above-described general formula (I) is preferably 0.0001 mol %, more preferably 0.001 mol %, further preferably 0.01 mol %. The upper limit of the use amount is preferably 1000000 mol %, more preferably 1000 mol %, further preferably 100 mol %.

In the present invention, it is preferable that a palladium complex containing a phosphine compound of the above-described general formula (II) and an aromatic compound of the above-described general formula (V) are reacted previously, then, allowed to contact an aromatic compound of the above-described general formula (I) before use in polycondensation, from the standpoint of narrowing the molecular weight distribution of the resultant aromatic polymer.

The use amount of an aromatic compound of the formula (V) based on a palladium atom contained in a palladium complex containing a phosphine compound of the formula (II) is preferably 1-fold mol or more from the standpoint of reactivity. When a palladium complex containing a phosphine compound of the formula (II) and an aromatic compound of the formula (V) are reacted before isolation of the resultant palladium complex compound, the use amount is preferably 2-fold mol or more, more preferably 10-fold mol or more, further preferably 30-fold mol or more. Though the upper limit of the molar ratio is not particularly restricted, the upper limit is preferably 200-fold mol or less, more preferably 100-fold mol from the standpoint of convenience of an isolation operation.

It is preferable that a palladium complex containing a phosphine compound of the formula (II) and an aromatic compound of the formula (V) are reacted, then, the resultant palladium complex compound is isolated, then, allowed to contact an aromatic compound of the above-described general formula (I) before use in polycondensation, from the standpoint of controlling the structure of the resultant aromatic polymer and narrowing the molecular weight distribution.

The method for reacting a palladium complex containing a phosphine compound of the above-described general formula (II) and an aromatic compound of the above-described general formula (V) is not particularly restricted. For example, they can be mixed under an inert gas atmosphere as described in J. Am. Chem. Soc. 126, 1184 (2004).

It is guessed that the reaction of a palladium complex containing a phosphine compound of the above-described general formula (II) and an aromatic compound of the above-described general formula (V) causes generation of a palladium complex compound of the following formula (VI) or a composition containing a palladium complex compound of the following formula (VI). A palladium complex compound of the following formula (VI) may be isolated before use.

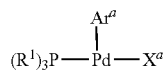

(VI)

(wherein, R$^1$, Ar$^a$ and X$^a$ are as defined above.)

When a palladium complex compound of the above-described general formula (IV) is isolated before use, the use amount of a palladium complex compound of the above-described general formula (IV) is not restricted, however, the use amount of Pd based on an aromatic compound of the above-described general formula (I) is preferably 0.0001 to 10 mol %, more preferably 0.001 to 5 mol %, further preferably 0.01 to 5 mol %.

In the present invention, as the reaction conditions in polycondensing the aromatic compound in the presence of the complex, reaction conditions for various aromatic coupling reactions using a palladium catalyst can be used described in Chem. Rev. 102, 1359 (2002) and its reference literatures. In particular, the reaction using an aromatic compound of the above-described general formula (I) in which M represents —B(OQ$^1$)$_2$ is a typical reaction called Suzuki coupling described in Chem. Rev. 95, 2457 (1995) and its reference literatures, and will be illustrated below as a typical example.

In this case, use of a base is desirable, and specific examples thereof include hydroxide salts, carbonate salts, phosphate salts and fluoride salts containing a lithium ion, sodium ion, potassium ion, cesium ion or tetraalkylammonium ion as a counter cation. Preferable are sedum hydroxide, potassium hydroxide, sodium carbonate, potassium carbonate and cesium carbonate.

Though the use amount of the base is not restricted, the use amount of the base based on an aromatic compound of the above-described general formula (I) is preferably 0.01 to 1000-fold mol, more preferably 0.1 to 100-fold mol, further preferably 1 to 30-fold mol.

The polycondensation using Suzuki coupling is desirably carried out in a reaction solvent. Examples of the reaction solvent include aromatic hydrocarbons such as benzene, toluene, xylene and the like; linear and cyclic aliphatic hydrocarbons such as heptanes, cyclohexane and the like; halogenated hydrocarbons such as chlorobenzene, dichlorobenzene, dichloromethane and the like; nitriles such as acetonitrile, benzonitrile and the like; alcohols such as methanol, ethanol, n-propyl alcohol, iso-propyl alcohol and the like; ethers such as dioxane, tetrahydrofuran, ethylene glycol dimethyl ether and the like; amides such as N,N-dimethylformamide, N-methylpyrrolidone and the like; nitro compounds such as nitromethane, nitrobenzene and the like; water. As the reaction solvent, aromatic hydrocarbons, halogenated hydrocarbons, nitriles, ethers, nitro compounds and water are preferable. These reaction solvents may be used singly or in admixture of two or more.

The use amount of the reaction solvent is usually 0.01 to 10000 mL for 1 g of an aromatic compound of the above-described general formula (I), and preferably 0.1 to 1000 mL, more preferably 1 to 200 mL.

The reaction temperature of polycondensation using Suzuki coupling is usually –100° C. to 200° C., preferably –50° C. to 150° C., more preferably –20° C. to 100° C. The reaction time is usually 0.1 minute to 1000 hours, preferably 1 minute to 500 hours, more preferably 10 minutes to 200 hours.

As the post treatment of polycondensation using Suzuki coupling, it is preferable that, when an aqueous layer is separated after completion of the reaction, liquid-partitioning is performed, and the resultant oil layer is washed with a hydrochloric acid aqueous solution or water if necessary, and the organic solvent is vaporized, or a poor solvent is added to cause precipitation, then, filtration, washing and drying are carried out to isolate an aromatic polymer.

In polycondensation of an aromatic compound of the above-described general formula (I) according to the present invention, when an aromatic compound of the above-described general formula (V) is allowed to coexist or when a palladium complex containing a phosphine compound of the above-described general formula (II) and an aromatic compound of the above-described general formula (V) are reacted previously before use, the aromatic polymer to be generated can get a structure of the following general formula (VII). It is guessed that polymerization is initiated from an aromatic compound of the above-described general formula (V), and an aromatic compound of the above-described general formula (I) is polycondensed in chain-like fashion. Thus, it is possible to obtain an aromatic polymer having narrower molecular weight distribution. If $Ar^a$ of an aromatic compound of the above-described general formula (V) is allowed to have a functional group, an aromatic polymer having a functional group in an initiation end structure is obtained. If an aromatic compound of the above-described general formula (V) is substituted by a compound having several initiation points, an aromatic polymer having several branches is obtained.

  (VII)

(wherein, $Ar^a$, Ar and X are as defined above, and i represents number-average polymerization degree of a repetition structure Ar)

In an aromatic polymer of the above-described general formula (VII), X is substituted by a hydrogen atom in some cases by a polymerization side reaction or post treatment reaction. After completion of the polymerization, addition of an aromatic compound of the following general formula (VIII) can give an aromatic polymer of the following general formula (IX).

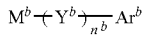  (VIII)

(wherein, $M^b$, $Y^b$ and $n^b$ have the same definitions as for the above-described M, Y and n, and $Ar^b$ has the same definition as for the above-described $Ar^a$)

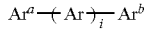  (IX)

(wherein, $Ar^a$, Ar, $Ar^b$ and i are as defined above)

The present invention will be illustrated further in detail based on examples below, but the scope of the present invention is not limited to these examples.

Example 1

A 50 ml egg plant flask was purged with argon, and 0.200 g (0.980 mmol) of pinacol phenylboronate (2), 0.236 g (1.00 mmol) of 1,4-dibromobenzene (1), 0.049 g (0.275 mmol) of anthracene, 15.3 ml of anhydrous THF and 9.8 ml of a 2 M sodium carbonate aqueous solution were added, deaerated using a diaphragm pump while stirring, then, purged with nitrogen. Also a 200 ml three-necked flask was purged with argon likewise, 4.5 mg (0.00491 mmol, 0.5 mol %) of $Pd_2$(dibenzoylacetone)$_3$, 4.3 ml of anhydrous THF and 10 ml of a 2M sodium carbonate aqueous solution were added, deaerated using a diaphragm pump while stirring, then, purged with nitrogen. To this was added, under nitrogen flow, 1.1 ml (0.0122 mmol, 1.2 mol %) of a THF solution of tri-t-butylphosphine adjusted to 2.25 mg/ml, via syringe. Further, mixed liquid of raw materials was added to the three-necked flask by a cannula, and the mixture was stirred at 60° C. for 3 hours. Using gas chromatography, conversion and yield were calculated from a calibration curve. The conversion of the pinacol phenylboronate was 96%, the total yield of 4-bromodiphenyl (3) and 4,4'-terphenyl (4) was 73%, and the production mol ratio of 3/4 was 4/96.

Comparative Example 1

The same reaction as in Example 1 was carried out excepting the phosphine compound was changed from tri-t-butylphosphine to 1,3-bis(diphenylphosphino)propane. The conversion of the pinacol phenylboronate was 98%, the total yield of 3 and 4 was 85%, and the production mol ratio of 3/4 was 40/60.

This reaction is shown in the following scheme 1. It is believed that when palladium shifts in the molecule, 4 is generated, and when palladium leaves, 3 is generated. Therefore, smaller the production ratio of 3/4, the proportion of moving of palladium in the molecule is larger. The production mol ratio of 3/4 was 40/60 in the case of use of 1,3-bis (diphenylphosphino)propane in Comparative Example 1, while 4/96 in the case of use of tri-t-butylphosphine in Example 1. From this result, it is shown that in a catalyst composed of tri-t-butylphosphine and palladium, mainly palladium shifts in the molecule. Thus, this catalyst provides catalyst shifting type chain polycondensation as described in Macromolecules 37, 1169 (2004), and an aromatic polymer of narrow molecular weight distribution can be obtained.

Scheme 1

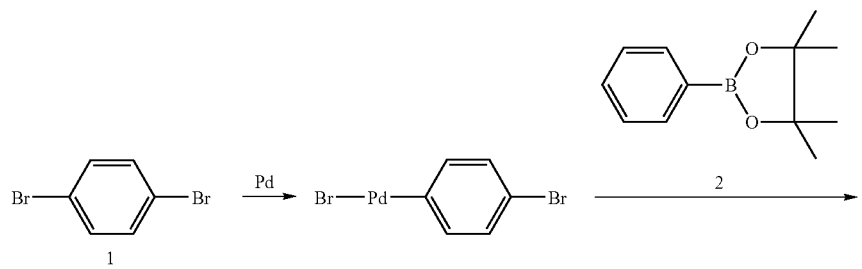

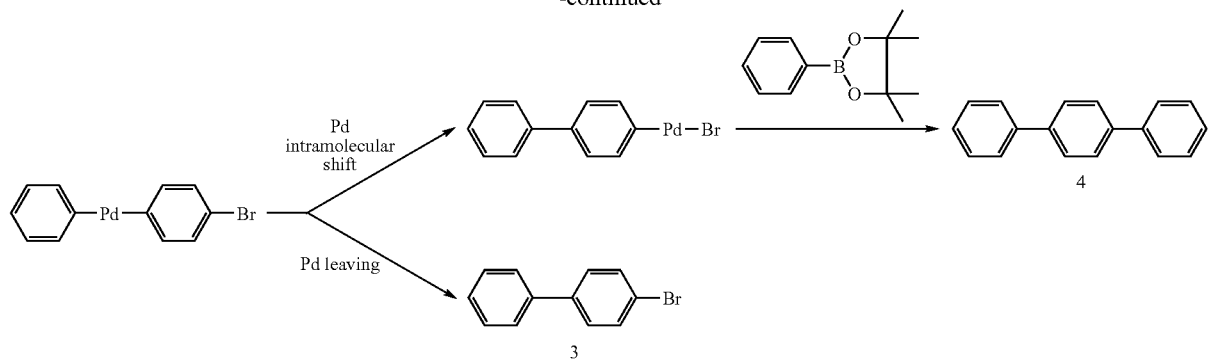

Example 2

In the experiment of Example 1, if reactivity with palladium is sufficiently larger for 3 than 1, there is a possibility of generation of mainly 4 even by leaving of palladium. To ascertain this possibility simultaneously, an experiment shown in the following scheme 2 was carried out.

A 50 ml egg plant flask was purged with argon, and 0.264 g (1.02 mmol) of pinacol t-butylphenylboronate (5), 0.236 g (1.00 mmol) of 1,4-dibromobenzene (1), 0.235 g (1.01 mmol) of 4-bromobiphenyl, 0.061 g (0.359 mmol) of octylbenzene, 15.0 ml of anhydrous THF and 10.0 ml of a 2 M sodium carbonate aqueous solution were added, deaerated using a diaphragm pump while stirring, then, purged with nitrogen. Also a 100 ml eggplant flask was purged with argon likewise, 4.6 mg (0.00503 mmol, 0.5 mol %) of $Pd_2$(dibenzoylacetone)$_3$, 5.0 ml of anhydrous THF and 10 ml of a 2 M sodium carbonate aqueous solution were added, deaerated using a diaphragm pump while stirring, then, purged with nitrogen. To this was added, under nitrogen flow, 1.05 ml (0.0119 mmol, 1.2 mol %) of a THF solution of tri-t-butylphosphine adjusted to 2.30 mg/ml, via syringe. Further, mixed liquid of raw materials was added to the 100 ml egg plant flask by a cannula, and the mixture was stirred at 60° C. for 3 hours. Using gas chromatography, conversion and yield were calculated from a calibration curve.

The conversion of the 5 was 100%, the total yield of 4-bromo-4'-t-butyl-p-terphenyl (6), 4,4''-di-t-butyl-p-terphenyl (7) and 4-t-butyl-p-terphenyl (8) based on 5 was 99%. The production mol ratio of 8/(6+7) was 51/49, and reactivities of 1 and 4 are approximately the same, thus, it is guessed that palladium shifter in the molecule. Under this condition, the production mol ratio of 6/7 represents the proportion of intramolecular shift of palladium, and the production mol ratio of 6/7 was 2/98.

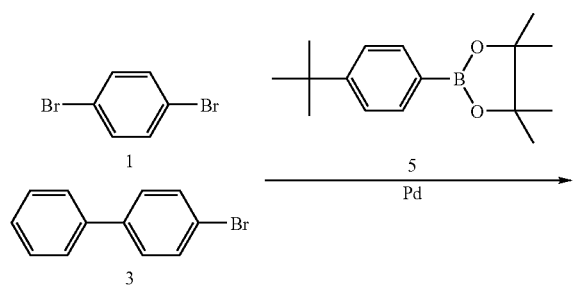

Scheme 2

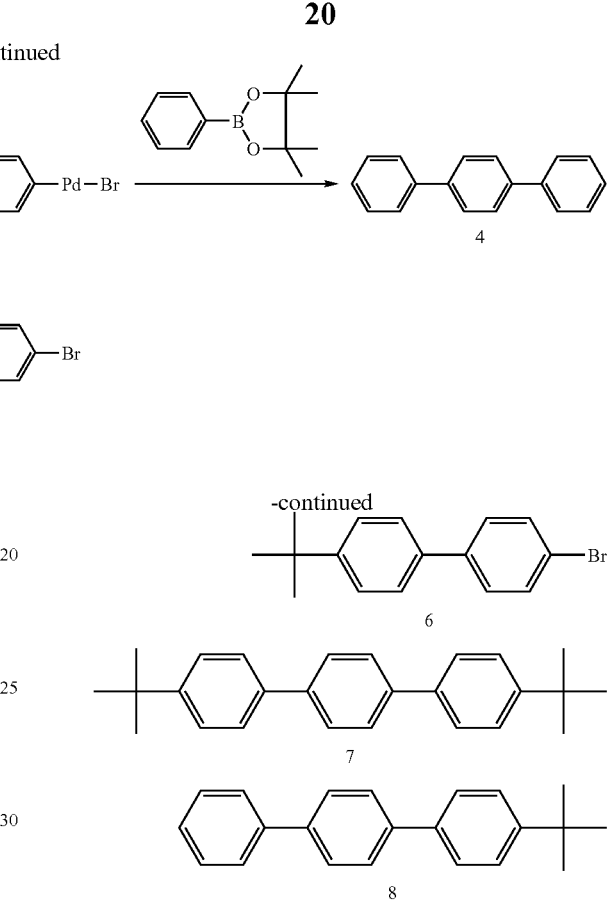

Example 3

A 50 ml egg plant flask was purged with argon, and 0.261 g (1.00 mmol) of pinacol t-butylphenylboronate (5), 0.238 g (1.01 mmol) of 1,4-dibromobenzene (1), 0.234 g (1.00 mmol) of 4-bromobiphenyl, 0.266 g (1.56 mmol) of octylbenzene, 15.0 ml of anhydrous THF and 10.0 ml of a 2 M sodium carbonate aqueous solution were added, deaerated using a diaphragm pump while stirring, then, purged with nitrogen. Also a 100 ml three-necked flask was purged with argon likewise, 4.6 mg (0.00503 mmol, 0.5 mol %) of $Pd_2$(dibenzoylacetone)$_3$, 4.9 mg (0.0118 mmol, 1.2 mol %) of 2-dicyclohexylphosphino-2',6'-dimethoxy-1,1'-biphenyl, 5.0 ml of anhydrous THF and about 10 ml of a 2 M sodium carbonate aqueous solution were added, deaerated using a diaphragm pump while stirring, then, purged with nitrogen. Mixed liquid of raw materials was added to the 100 ml egg plant flask by a cannula, and the mixture was stirred at 60° C. for 3 hours. Using gas chromatography, conversion and yield were calculated from a calibration curve.

The conversion of 5 was 73%, the total yield of 6, 7 and 8 based on 5 was 99%, the production mol ratio of 8/(6+7) was 47/53. Under this condition, the production mol ratio of 6/7 representing the proportion of intramolecular shift of palladium was 2/98.

Example 4

A 50 ml egg plant flask was purged with argon, and 0.260 g (1.00 mmol) of pinacol t-butylphenylboronate (5), 0.239 g (1.01 mmol) of 1,4-dibromobenzene (1), 0.234 g (1.00 mmol) of 4-bromobiphenyl, 0.127 g (0.743 mmol) of octylbenzene, 15.0 ml of anhydrous THF and 10.0 ml of a 2 M sodium carbonate aqueous solution were added, deaerated using a diaphragm pump while stirring, then, purged with nitrogen. Also a 100 ml egg plant flask was purged with argon likewise, 4.6 mg (0.00503 mmol, 0.5 mol %) of Pd$_2$(dibenzoylacetone)$_3$, 5.6 mg (0.0120 mmol, 1.2 mol %) of 2-dicyclohexylphosphino-2',6'-di-i-propoxy-1,1'-biphenyl, 5.0 ml of anhydrous THF and about 10 ml of a 2 M sodium carbonate aqueous solution were added, deaerated using a diaphragm pump while stirring, then, purged with nitrogen. Mixed liquid of raw materials was added to the 100 ml egg plant flask by a cannula, and the mixture was stirred at 60° C. for 3 hours. Using gas chromatography, conversion and yield were calculated from a calibration curve.

The conversion of 5 was 61%, the total yield of 6, 7 and 8 based on 5 was 85%, the production mol ratio of 8/(6+7) was 46/54. Under this condition, the production mol ratio of 6/7 representing the proportion of intramolecular shift of palladium was 1/99.

Example 5

(i) Synthesis of P($^t$Bu)$_3$Pd(Ph)Br: According to a known method, bis(tri-t-butylphosphine)palladium (0) and bromobenzene were reacted under an inert gas atmosphere to synthesize P($^t$Bu)$_3$Pd(Ph)Br (reference literature: J. Am. Chem. Soc. 126, 1184 (2004)).

(ii) Synthesis of 4-bromo-2,5-dibutoxybenzeneboronic acid: According to a known synthesis method, 4-bromo-2,5-dibutoxybenzeneboronic acid was synthesized from 1,4-dibromo-2,5-dibutoxybenzene (reference literature: Macromol. Chem. Phys. 195, 1933 (1994)). 4-bromo-2,5-dibutoxybenzeneboronic acid had been re-crystallized from chloroform-hexane, before use in polymerization.

(iii) Polymerization of 4-bromo-2,5-dibutoxybenzeneboronic acid: Under an inert gas atmosphere, into a 50 mL two-necked egg plant flask was charged 172 mg (0.5 mmol) of 4-bromo-2,5-dibutoxybenzeneboronic acid, 15 mL of tetrahydrofuran and octylbenzene (internal standard substance, 100 µL), and they were dissolved, then, 10 mL of 2 M Na$_2$Co$_3$ aq. was charged. While stirring at 15 to 20° C., deaeration and purging with an inert gas were performed using a diaphragm pump. Separately, in an argon globe box, a yellow solution prepared by dissolving 11.6 mg (0.025 mmol, 5 mol %) of P$^t$Bu$_3$Pd(Ph)Br in 5 mL of tetrahydrofuran was charged in one portion into the above-described monomer solution under an inert gas atmosphere, and the mixture was thermally insulated at room temperature for minutes. A colorless transparent aqueous layer was partitioned at room temperature, then, 5 mL of 2 N hydrochloric acid was added into an oil layer and stirred, to cause deposition of an aromatic polymer. The deposited aromatic polymer was taken out by filtration, washed with methanol and water, and dried under reduced pressure, to obtain an aromatic polymer as white powder. Yielded amount: 90 mg Yield: 82%

The aromatic polymer was flown at a flow rate of 0.5 mL/min using tetrahydrofuran as a developing solvent and the molecular weight of the polymer was measured at 40° C., using a column composed of three TSKgel SuperHM-H (18 cm) (manufactured by Tosoh Corp.) connected serially, by GPC (manufactured by Tosoh Corp.: HLC-8220GPC System (RI detector)). Polystyrene-reduced number-average molecular weight, weight-average molecular weight and degree of dispersion were Mn=1.1×10$^4$, Mw=1.6×10$^4$ and Mw/Mn=1.5, respectively.

By $^1$H-NMR (CHCl$_3$-d) analysis, a hydrogen atom (d 7.66, 2H) at 2,6-position of end structure 9, a hydrogen atom (d 0.90, 6H) of a methyl group of repetition structure 10, and a hydrogen atom (d 0.98, 6H) of a methyl group of end structure 11 were observed, and the molar ratio of the structures calculated from area ratio thereof was 9:10:11=4.4:90.9:4.7. Since the end structure 9 and the end structure 11 show approximately the same amount, it is guessed that polymerization was initiated from the end structure 9, the repetition structure 10 grew in chain-like fashion, and a bromine atom on the end structure 12 was substituted by a hydrogen atom to give the end structure 11.

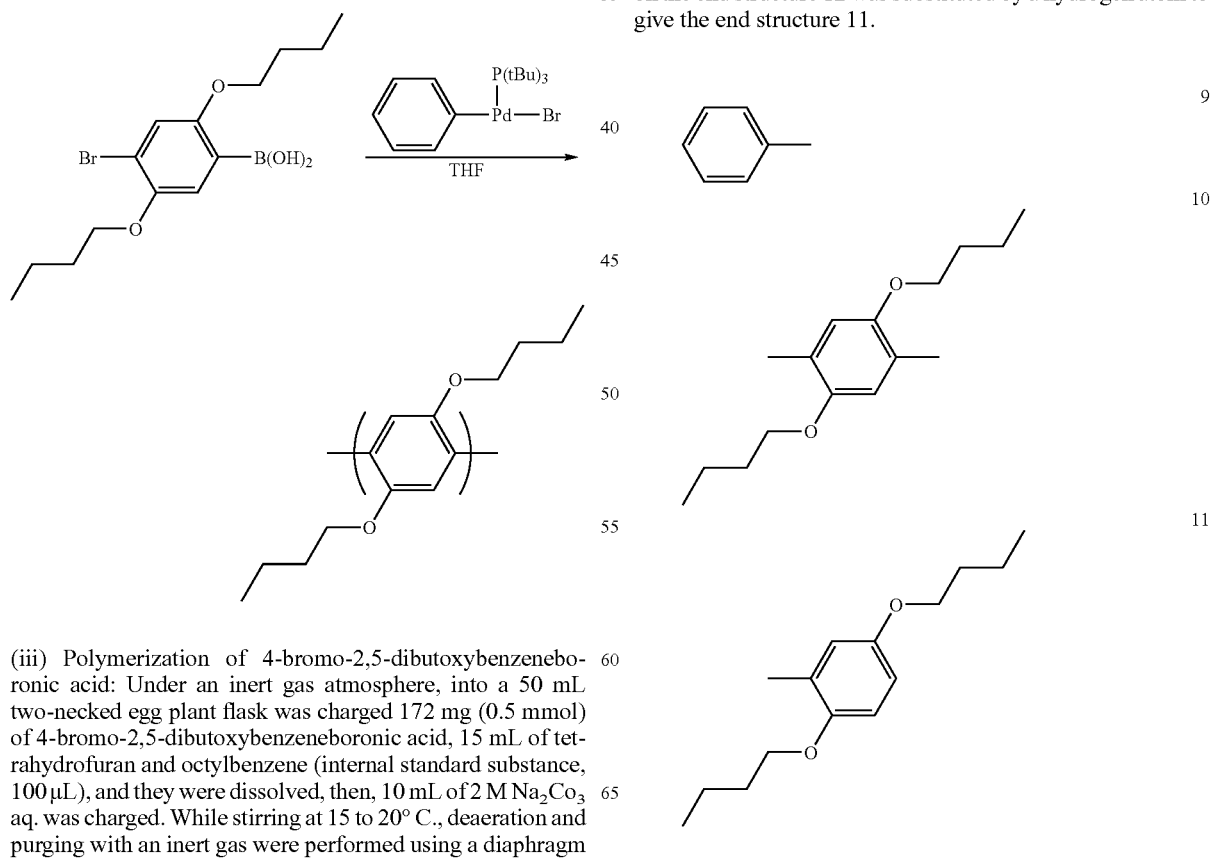

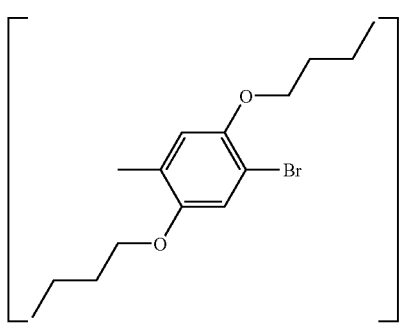

Comparative Example 2

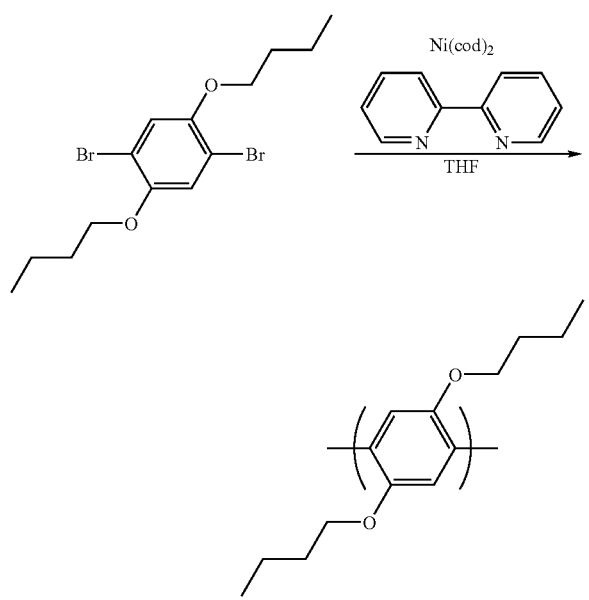

Polymerization of 1,4-dibromo-2,5-dibutoxybenzene: Under an inert gas atmosphere, into a 200 mL three-necked flask was charged 1.04 g (2.73 mmol) of 1,4-dibromo-2,5-dibutoxybenzene, 1.03 g (6.57 mmol) of 2,2'-bipyridyl and 95 mL of commercially available dehydrated tetrahydrofuran, these were dissolved by stirring, then, deaerated by bubbling with an argon gas. Into the mixture heated up to 60° C. was charged 1.65 g (6.01 mmol) of bis(1,5-cyclooctadiene)nickel (0), the mixture was thermally insulated at 60° C. for 3 hours, then, cooled down to room temperature, and a mixed solution of methanol 81 g/distilled water 105 g/25% ammonia water 11 g was dropped in under stirring, to cause precipitation of an aromatic polymer. The aromatic polymer was filtrated, washed with a mixed solution of methanol/distilled water, and dried under reduced pressure, to obtain a coarse aromatic polymer. The resultant coarse aromatic polymer was dissolved in toluene, and insoluble components were separated by filtration through a filtration apparatus pre-coated with radiolite, then, the liquid was passed through an alumina column, washed with a 5% hydrochloric acid aqueous solution and 4% ammonia water sequentially, then, condensed, and dropped into methanol to cause precipitation of an aromatic polymer. The aromatic polymer was taken out by filtration, and washed with methanol and dried under reduced pressure, to obtain an aromatic polymer. Yielded amount: 376 mg Yield: 62%

The molecular weight of the aromatic polymer was measured in the same manner as in Example 5, to find that the polystyrene-reduced number-average molecular weight Mn, weight-average molecular weight Mw and degree of dispersion Mw/Mn were $Mn=2.6\times10^4$, $Mw=6.9\times10^4$ and Mw/Mn=2.6, respectively.

Example 6

A 50 ml egg plant flask was purged with argon, and 0.205 g (0.1004 mmol) of pinacol phenylboronate (2), 0.549 g (1.00 mmol) of 2,7-dibromo-9,9-dioctylfluorene, 0.128 g (0.675 mmol) of octylbenzene, 15 ml of anhydrous THF and 10 ml of a 2 M sodium carbonate aqueous solution were added, deaerated using a diaphragm pump while stirring, then, purged with nitrogen. Also a 100 ml three-necked flask was purged with argon likewise, 4.6 mg (0.00503 mmol, 0.5 mol %) of $Pd_2$(dibenzoylacetone)$_3$, 5 ml of anhydrous THF and 10 ml of a 2 M sodium carbonate aqueous solution were added, deaerated using a diaphragm pump while stirring, then, purged with nitrogen. To this was added, under nitrogen flow, 0.87 ml (0.0120 mmol, 1.2 mol %) of a THF solution of tri-t-butylphosphine adjusted to 2.78 mg/ml, via syringe. Further, mixed liquid of raw materials was added to the three-necked flask by a cannula, and the mixture was stirred at 60° C. for 3 hours. Using gas chromatography, conversion and yield were calculated from a calibration curve. The conversion of the pinacol phenylboronate was 83%, the total yield of 2-bromo-7-phenyl-9,9-dioctylfluorene (14) and 2,7-diphenyl-9,9-dioctylfluorene (15) was 93%, and the production mol ratio of 14/15 was 1/99.

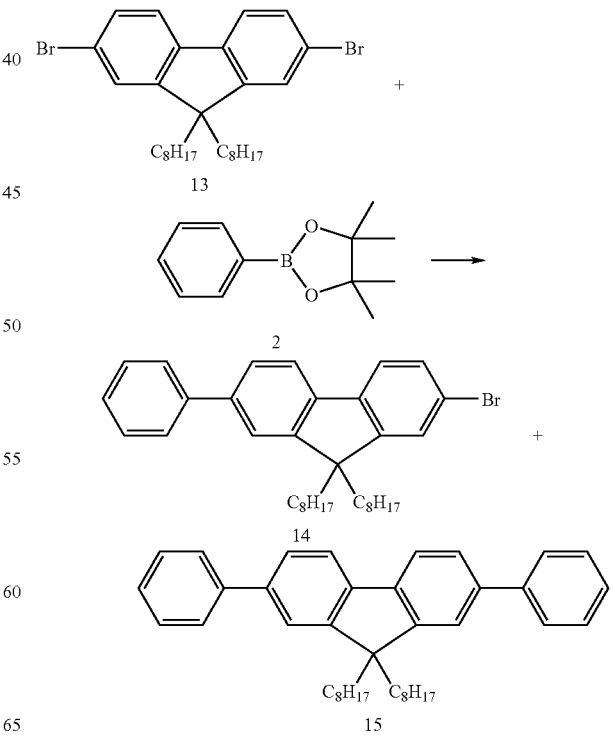

Example 7

Polymerization of pinacol 2-bromo-9,9-dioctylfluorene-7-boronate: Under an inert gas atmosphere, into a 50 mL two-necked egg plant flask was charged 149 mg (0.25 mmol) of pinacol 2-bromo-9,9-dioctylfluorene-7-boronate and 8 mL of tetrahydrofuran, and they were dissolved, then, 5 mL of 2 M $Na_2CO_3$ aq. was charged. While stirring at 15 to 20° C., deaeration and purging with an inert gas were performed using a diaphragm pump. Separately, a yellow solution prepared by dissolving 5.8 mg (0.025 mmol, 5 mol %) of $P^tBu_3Pd(Ph)Br$ in 2 mL of tetrahydrofuran was charged in one portion into the above-described monomer solution under an inert gas atmosphere, and the mixture was thermally insulated at room temperature for 30 minutes. An aqueous layer was partitioned at room temperature, then, 5 mL of 2 N hydrochloric acid and 20 ml of methanol were added into an oil layer and stirred. The deposited aromatic polymer was taken out by filtration, washed with methanol and water, and dried under reduced pressure, to obtain an aromatic polymer as yellow powder. Yielded amount: 83 mg Yield: 85%

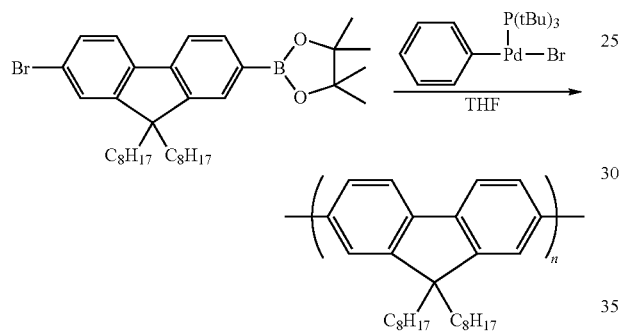

The molecular weight of the aromatic polymer was measured in the same manner as in Example 5, to find that the polystyrene-reduced number-average molecular weight Mn, weight-average molecular weight Mw and degree of dispersion Mw/Mn were Mn=$1.8\times10^4$, Mw=$2.4\times10^4$ and Mw/Mn=1.3, respectively.

Thus, the production method of the present invention can provide an aromatic polymer in which the molecule weight distribution (weight-average molecular weight/number-average molecular weight) is narrow (typically, 1.0 or more and 1.5 or less), though the molecular weight is high (typically, number-average molecular weight is 10000 or more).

Particularly, when a bi-functional organic group represented by removal of each one hydrogen atom from two carbon atoms in an aromatic ring carrying hydrogen atoms of a ring-condensing or transannular aromatic ring is used as a monomer as a repeating unit, the proportion of intramolecular shift in polycondensation is enhanced, further, an aromatic polymer in which the molecule weight distribution (weight-average molecular weight/number-average molecular weight) is narrow (typically, 1.0 or more and 1.3 or less) can be obtained. As the ring-condensing or transannular aromatic ring, transannular aromatic rings are preferable, and a fluorene ring is more preferable.

INDUSTRIAL APPLICABILITY

The present invention provides a method for producing an aromatic polymer having high molecular weight and having narrow molecular weight distribution. The aromatic polymer obtained by the present invention has narrow molecular weight distribution, accordingly, is expected to have a property of highly self integration and formation of an accurate layer structure, thus, it has excellent properties in electric properties, optical properties, heat resistance, mechanical properties and the like, and is useful for advanced functional materials such as electrically conductive materials, photoelectric conversion materials, light emitting materials, non-linear optical materials, battery materials, electronic part materials, automobile materials and the like.

The invention claimed is:

1. A method for producing an aromatic polymer comprising polycondensing an aromatic compound of the following formula (I) in the presence of a palladium complex containing a phosphine compound of the following formula (II):

(I)

wherein Ar represents an aromatic ring-containing bi-functional organic group, X represents a halogen atom, a nitro group or a group of the formula: —$SO_3Q$ (wherein, Q represents an optionally substituted hydrocarbon group), Y represents an oxygen atom, sulfur atom, imino group, substituted imino group, ethenylene group, substituted ethenylene group or ethynylene group, and n represents 0 or 1, M represents a hydrogen atom, —$B(OQ^1)_2$, —$Si(Q^2)_3$, —$Sn(Q^3)_3$ or $Z^1(Z^2)_m$ (wherein, $Q^1$ represents a hydrogen atom or hydrocarbon group and two $Q^1$s may be the same or different and may form a ring, $Q^2$ represents a hydrocarbon group and three $Q^2$s may be the same or different, and $Q^3$ represents a hydrocarbon group and three $Q^3$s may be the same or different, $Z^1$ represents a metal atom or metal ion, $Z^2$ represents a counter anion, and m represents an integer of 0 or more,

(II)

wherein $R^1$ represents a group of the following formula (III) or a group of the following formula (IV) and three $R^1$s may be the same or different, providing at least one of three $R^1$s is a group of the following formula III,

(III)

wherein $R^2$ represents a hydrogen atom or an optionally substituted hydrocarbon group, three $R^2$s may be the same or different, two $R^2$s may together form a ring, providing two or more $R^2$s do not represent a hydrogen atom simultaneously,

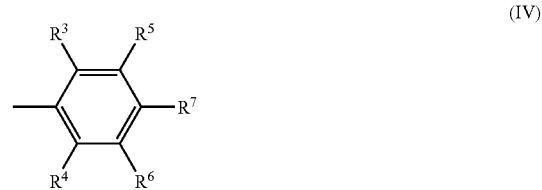

(IV)

wherein $R^3$ to $R^7$ represent each independently a hydrogen atom, an optionally substituted hydrocarbon group, hydrocarbon oxy group, hydrocarbon di-substituted amino group, hydrocarbon mercapto group, hydrocarbon carbonyl group, hydrocarbon oxycarbonyl group, hydrocarbon di-substituted aminocarbonyl group or hydrocarbon sulfonyl group, at least one of $R^3$ and $R^4$ is not a hydrogen atom, and $R^3$ and $R^5$, $R^5$ and $R^7$, $R^4$ and $R^6$, and $R^6$ and $R^7$ may each together form a ring, wherein the palladium complex containing a phosphine compound of formula (II) and the aromatic compound of formula (V):

$$Ar^a - X^a \qquad (V)$$

wherein $Ar^a$ represents an aromatic ring containing monofunctional organic group, $X^a$ represents a halogen atom or a group of the formula: $-SO_3Q^a$, wherein $Q^a$ represents an optionally substituted hydrocarbon group, are reacted previously to form a compound represented by formula (VI), and then the compound represented by formula (VI) is allowed to contact the aromatic compound of formula (I),

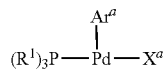
(VI)

wherein $R^1$, $Ar^a$ and $X^a$ are as defined above.

2. The method for producing an aromatic polymer according to claim 1, wherein $R^3$ to $R^7$ in the formula (IV) represent each independently a hydrogen atom or an optionally substituted hydrocarbon group.

3. A method for producing an aromatic polymer according to claim 1, wherein the compound represented by formula (VI) is isolated before allowing to contact the aromatic compound represented by formula (I).

* * * * *